United States Patent
Tamagno et al.

(10) Patent No.: US 7,178,724 B2
(45) Date of Patent: Feb. 20, 2007

(54) SMART CARD DEVICE AND METHOD USED FOR TRANSMITTING AND RECEIVING SECURE E-MAILS

(75) Inventors: David Tamagno, Austin, TX (US); Jerome Tournemille, Austin, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 384 days.

(21) Appl. No.: 10/419,576

(22) Filed: Apr. 21, 2003

(65) Prior Publication Data

US 2004/0206812 A1 Oct. 21, 2004

(51) Int. Cl.
G06K 5/00 (2006.01)

(52) U.S. Cl. ...................... 235/380; 235/492

(58) Field of Classification Search ................ 235/492, 235/380, 382, 375, 451; 713/172, 173, 202
See application file for complete search history.

(56) References Cited

U.S. PATENT DOCUMENTS

| | | | | |
|---|---|---|---|---|
| 5,847,372 | A | 12/1998 | Kreft .......................... 235/492 |
| 6,009,462 | A * | 12/1999 | Birrell et al. ................ 709/206 |
| 6,168,077 | B1 | 1/2001 | Gray et al. ................... 235/375 |
| 6,195,700 | B1 | 2/2001 | Bender et al. ............... 709/230 |
| 6,343,364 | B1 * | 1/2002 | Leydier et al. .............. 713/500 |
| 6,434,405 | B1 | 8/2002 | Sashihara ..................... 455/557 |
| 6,439,464 | B1 * | 8/2002 | Fruhauf et al. .............. 235/492 |
| 6,470,284 | B1 * | 10/2002 | Oh et al. ....................... 702/64 |
| 6,513,721 | B1 | 2/2003 | Salmre et al. ............... 235/492 |
| 6,862,583 | B1 * | 3/2005 | Mazzagatte et al. .......... 705/64 |
| 6,873,715 | B2 * | 3/2005 | Kuo et al. .................... 382/119 |
| 2002/0053028 | A1 | 5/2002 | Davis .......................... 713/200 |
| 2002/0066791 | A1 | 6/2002 | Leydier et al. ............. 235/492 |
| 2002/0069358 | A1 | 6/2002 | Silvester ..................... 713/176 |
| 2002/0147909 | A1 | 10/2002 | Mullen et al. .............. 713/173 |
| 2002/0174071 | A1 | 11/2002 | Boudou et al. ................ 705/41 |
| 2002/0174235 | A1 * | 11/2002 | Likourezos ................. 709/228 |
| 2002/0194479 | A1 * | 12/2002 | Beuten et al. .............. 713/172 |
| 2004/0088567 | A1 * | 5/2004 | Lamotte ...................... 713/200 |

FOREIGN PATENT DOCUMENTS

| | | |
|---|---|---|
| EP | 1 162 781 A2 | 12/2001 |
| EP | 1 235 142 A2 | 8/2002 |
| WO | 93/17388 | 9/1993 |
| WO | 95/22810 | 8/1995 |
| WO | WO99/17241 | 4/1999 |
| WO | 99/35783 | 7/1999 |
| WO | 99/49415 | 9/1999 |
| WO | 01/96990 | 12/2001 |
| WO | 02/35764 | 5/2002 |

* cited by examiner

*Primary Examiner*—Steven S. Paik
(74) *Attorney, Agent, or Firm*—Lisa K. Jorgenson; Christopher F. Regan

(57) ABSTRACT

A system and method for transmitting and receiving secure e-mails is disclosed. A smart card device stores both private and public keys for an encryption algorithm. The smart card device is preferably a USB smart card device and interfaces a host having a client e-mail program. E-mails are transferred to and/or from the client e-mail program and e-mail server via the smart card while decrypting and encrypting any transmitted and/or received e-mails within the smart card device. The smart card device stores an IP address for an e-mail server. A Simple Mail Transfer Protocol outgoing parameter is set from the client e-mail program to an IP address for the smart card device.

24 Claims, 5 Drawing Sheets

SMART CARD DEVICE AND METHOD USED FOR TRANSMITTING AND RECEIVING SECURE E-MAILS

FIELD OF THE INVENTION

This invention relates to the field of smart cards, and more particularly, this invention relates to a system and method for transmitting and receiving secure e-mails using a smart card device.

BACKGROUND OF THE INVENTION

Smart cards are plastic cards having an embedded Integrated Circuit (IC). That IC may be a logic circuit with its associated memories or a microcontroller with its associated memories and software, or a microcontroller with its associated memories and software coupled to a custom circuit block or interface.

To use the computing power of the IC, a smart card makes use of a full set of packaging technologies. For example, the die size varies from 1 $mm^2$ to 30 $mm^2$, but is limited because of the mechanical limitations imposed by the plastic construction of the smart card. The IC is attached to a lead frame and wire-bonding techniques are used to connect the IC pads to the lead frame contacts. Potting or other strengthening methods can be used to protect the IC against chemical and mechanical stresses during manufacturing and are a part of everyday usage of a smart card. Eight contacts are typically located on one side of the card. The smart card performs transactions with a smart card reader using a serial protocol. The mechanical and electrical specifications for a smart card are published by the International Standard Organization (ISO) as ISO7816-X standards, which have allowed the simple and massproduced magnetic stripe cards to evolve toward the smart card. This natural evaluation has allowed smart cards, depending on the IC complexity, of course, to perform pre-paid accounting, cryptographic scheme, personal authentication using a PIN code, biometrics, and java scripts, for example.

ISO documents ISO 7816-1 Physical Characteristics, ISO 7816-2 Dimensions and Locations of the contacts, ISO 7816-3 Electronic signals and transmission protocols, ISO 7816-4 Interindustry Commands for Interchange, and ISO 7816-10 Electronic signals and answer to reset for synchronous cards are incorporated herein by reference.

In operation, smart card readers are recognized by the reader infrastructure or a host computer prior to performing any transaction involving a smart card. The infrastructure runs an application involving the smart card. The half duplex protocol between the smart card and the smart card reader, in which either the smart card sends information to the smart card reader or vice versa, cannot start until a smart card is in place and detected by the smart card reader. The infrastructure manages authentication or transactions for pre-paid cards in public telephony, for Bankcards in Point-of-Sale (POS) terminals and Automatic Teller Machines (ATM), for Pay TV providers in set top boxes, and for wireless telecom operators in Subscriber Identification Modules (SIM) used in Global System for Mobile (GSM) terminals. Except for SIM cards, all other smart card reader applications use a physical sensor to detect the smart card. This sensor tells the smart card reader when a smart card is in place, i.e., when the smart card lead frame contacts mate with the smart card reader contacts.

When the smart card reader has established that a smart card is in place, a power-up sequence begins. After this power-up sequence has finished, the smart card reader typically provides a clock to the smart card and releases a reset signal. The smart card then executes its stored Operating System (OS). The SIM card, on the other hand, is in place only once with the power-off and used constantly subsequent to its positioning.

The first application for smart card technology was the public telephone system. The smart card die size was typically less than 1 $mm^2$, and only memories and logic circuits were integrated in the IC. The smart card reader used all eight contacts to interface properly with the different smart card generations. When the smart card was inserted in the payphone, the telephone infrastructure authenticated the smart card and the telephone removed "units" from the smart card.

The banking industry subsequently adopted smart cards. The die size was about 10 $mm^2$, and a microcontroller and its associated memories and software were integrated in the IC. The smart card reader used up to six contacts to interface properly with the different smart card generations. When a smart card was inserted in the ATM or the POS (point-of-sale), the smart card user was authenticated with a PIN code. The smart card could store different items, such as the balance of cash received from an ATM on a per week basis or details of purchases since a last closing date. Based on this information, authorization could be issued on the spot once the PIN had authenticated the debtor. This was accomplished without telephone calls to the bank.

Another application for smart cards has been developed by GSM manufacturers. The die size in a SIM is about 30 $mm^2$, and a microcontroller and its associated memories and software are integrated in the IC. The SIM reader uses five contacts to interface properly with the smart card. The more sophisticated smart card applications are performed in GSM using Java applets.

A new market for the smart card has emerged with the growth of the internet accessed from a personal computer. Secure message, Public Key Infrastructure, Authentication and Electronic Payment are new smart card areas of interest. The smart card acts as an e-commerce facilitator. One advantage of a smart card compared to other solutions is the smart card PIN located in its memory that is never communicated in any transaction.

Presently, a smart card is inserted into a smart card reader connected to a host computer. Two protocols are involved in supporting transactions between the smart card and host computer. The first protocol complies with the ISO-7816-3, which provides detailed requirements for the serial interface between smart card and smart card reader. The reader is connected to the computer via a serial port, a parallel port, or the Universal Serial Bus (USB), using a second protocol. The smart card reader contains electronic circuits and embedded software that enable communication between the smart card using the first protocol and the host computer using the second protocol. The host computer is loaded with any appropriate drivers to support the smart card reader.

Many countries have begun to use the smart card in the PC environment. The die size used in these applications ranges from 5 $mm^2$ to 30 $mm^2$ and the microcontroller and its associated memories and software are integrated in the IC typically with a cryptocontroller. Sometimes, a bio-sensor is integrated. The smart card reader uses at least five contacts to interface properly with the smart card in these applications.

Since the late 1990's, the universal serial bus (USB) has become firmly established and has gained wide acceptance in the PC marketplace. The USB was developed in response to a need for a standard interface that extends the concept of "plug and play" to devices external to a PC. It has enabled users to install and remove external peripheral devices without opening the PC case or removing power from the PC. The USB provides a low-cost, high performance, half-duplex serial interface that is easy to use and readily expandable.

USB uses four wires. The power supply is carried with two wires (VBus and ground), and data is carried with the other two wires (D+, D−). The latest version of the USB is currently defined by the Universal Serial Bus Specification Revision 2.0, written and controlled by USB Implementers Forum, Inc., a non-profit corporation founded by the group of companies that developed the USB Specification.

In particular, Chapter 5 USB Data Flow Model, Chapter 7 Electrical, Chapter 8 Protocol Layer and Chapter 9 USB Device Framework of Universal Serial Bus Specification are incorporated herein by reference. The increasingly widespread use of the USB has led smart card reader manufacturers to develop USB interfaces for connection of their products to host computers to complement the existing serial and parallel interfaces.

It is also possible to use smart cards as security devices. For example, it may be possible to use a smart card for securing e-mails. At the present time, there are many solutions for securing e-mails. Some products are free and others are commercial software products, which all allow users to encrypt their e-mails. As a software solution, however, keys are required to be stored on the machine they are used. This is an important problem in terms of security, because if anybody could hack the personal computer on which the keys are stored, the confidentiality is no longer guaranteed.

Some hardware solutions use traditional smart cards along with the personal computer. This allows a user to encrypt the e-mail through a secure device and generally requires a proprietary piece of software on the PC to perform an encryption using the smart card device. This type of solution works only if proprietary software is available. This is problematic when people move from one personal computer to another personal computer or move between offices, sites or between the home and office or other locations.

SUMMARY OF THE INVENTION

It is therefore an object of the present invention to use a smart card device that overcomes the disadvantages for transmitting and receiving secure e-mails.

In accordance with the present invention, a smart card system and method transmits and receives secure e-mails. In one aspect of the invention, a smart card device reader is adapted to be connected to a host having a client e-mail program for transmitting and/or receiving e-mails to and/or from an e-mail server. A smart card device is received within the smart card device reader and includes a card body and an integrated circuit carried by the card body. A memory as part of the integrated circuit stores a set of instructions relating to initiating and completing smart card transactions between the smart card device and a port of the host. It also stores both private and public keys for an encryption algorithm. A microprocessor is operative for communicating with the host via the smart card reader and operative for transferring e-mails to and/or from the client e-mail program and the e-mail server via the smart card device, while decrypting and encrypting any transmitted and/or received e-mails within the smart card device.

In one aspect of the present invention, the smart card device comprises a universal serial bus smart card device (USD). The smart card device also comprises, in one aspect of the invention, a universal serial bus token. The smart card system can further comprise a password stored in the memory wherein the smart card device is operative for transferring e-mails only after a correct password has been entered and matched to the password stored in memory. The private key can be configured within the smart card device at the time of issuance.

In yet another aspect of the present invention, a simple mail transfer protocol (SMTP) outgoing parameter is stored within the memory and set to an IP address for the smart card device. Public keys can be added and/or revoked based on user input. The smart card device can be operative for returning the results of any commands back from a remote post office protocol (POP) server to a client e-mail program on the host.

An integrated circuit and smart card itself is also disclosed. In a method aspect of the present invention, both private and public keys for an encryption algorithm are stored in a smart card device. The user interfaces the smart card device with a host having a client e-mail program. E-mails are transferred to and/or from the client e-mail program and an e-mail server via the smart card device, while decrypting and encrypting any transmitted and/or received e-mails within the smart card device.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
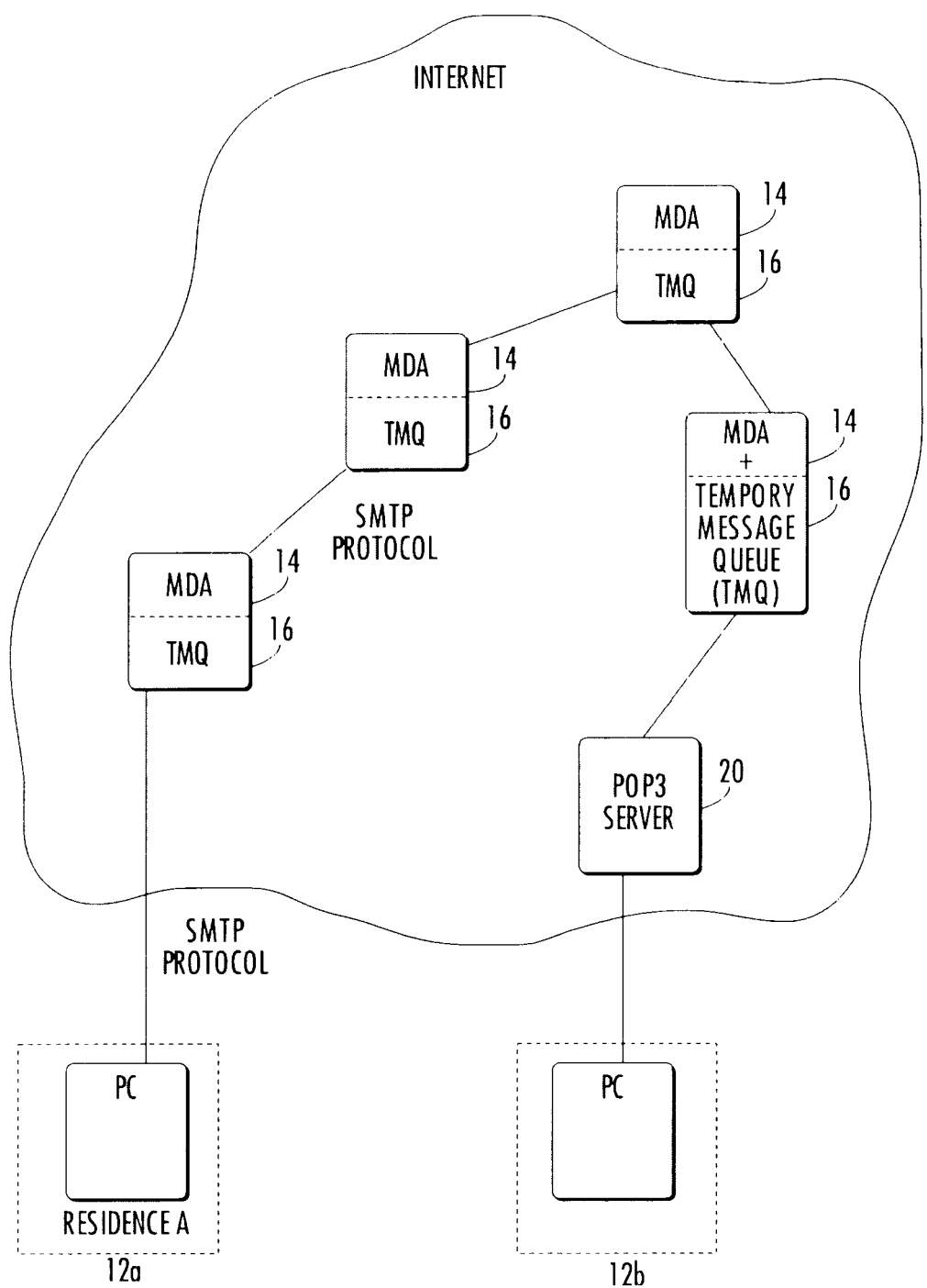
FIG. 1 is a block diagram showing basic elements of an e-mail system with Message Delivery Agents (MDA) used in conjunction with a Post Office Protocol 3 (POP3) server and operative with Temporary Message Queues (TMQ), end users and operative using the Simple Mail Transfer Protocol (SMTP).

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously provides a portable solution for transmitting and receiving secure e-mails, such as when traveling and using laptops at various locations, or when a personal computer (PC) is used as a workstation and no longer dedicated to one user. Many users have physical access to the same machine.

By using a smart card device having both the private key and public key embedded therein, a user can send and receive e-mails in a secure way, on any PC, even when a PC is operative as a workstation used by many different users. The present invention is operative by using the usual e-mail server and any client e-mail program. Thus, it is possible to secure e-mails without relying on a network-based user/password protocol, such as commonly used with the internet, which can be easily trespassed and compromised. The present invention provides a simple, low-cost solution using the standard e-mail protocol and application in conjunction with a universal serial bus smart card device (USD). Also, custom software does not have to be installed on a PC for using those secure channels.

The present invention overcomes the disadvantage of prior art solutions for securing e-mails or encrypting e-mails, such as software solutions that require keys to be stored on a computer in which they are used. Storing keys on a PC can be a problem for security because anyone could "hack" the PC in which the keys are stored. Thus, the confidentiality of the keys is no longer guaranteed. Some hardware solutions use a traditional smart card device and PC to allow a user to encrypt the e-mail through a secure device. These prior art solutions, however, generally require that proprietary software be implemented on the PC to perform the encryption using the smart card device. The present invention overcomes this problem. The present invention does not require this type of proprietary software as would be required in the prior art solution, and the use of the present invention is not limited when a user moves from one PC to another PC, between offices, between sites, and between the home and office.

In the present invention, sensitive e-mails are left encrypted on the e-mail server, typically on the internet. A user accesses these protected e-mails only when a user has the both the password and the smart card device such as the preferred USB smart card device (USD) holding the public and private keys. No software installation is required on a personal computer except for that required for key management. The USD is used as a secure medium for the keys.

The present invention relies on two common and well understood protocols: SMTP (Simple Mail Transfer Protocol) and POP (Post Office Protocol). Those protocols are widely used with current e-mail clients, and work by using a client/server protocol, which simplifies considerably the required TCP/IP stack implementation. The USD holds the private and public keys as a "safe" and is responsible for the public key infrastructure management.

For purposes of background, an internet e-mail delivery system is shown in FIG. 1 and shows a typical store and forward system 10 with endpoints shown as user agents 12a, 12b, such as the personal computers each in a residence and communicating to each other. Each user agent 12 or personal computer would have a client e-mail program. Any composed e-mail message is transferred to a message transfer agent (MTA) 14, which could include a temporary message queue (TMQ) 16, such as a hard disk that temporarily stores messages. The server would attempt to forward a queued message to another MTA 14 on a remote server or other computer. The message is routed through various MTA's until it reaches a recipient's mail server typically a Post Office Protocol 3 (POP3) server 18. The messages are delivered using the Simple Mail Transfer Protocol (SMTP).

The present invention does not disturb this working process and uses this client/server protocol. The smart card device holds the private and public keys as a "safe" and is responsible for public key infrastructure management.

It is well known that public-key encryption uses a combination of private key and a public key in which the private key is usually only known to a user's computer and the public key is given by a user's computer to any computer that desires to communicate securely. With public key encryption, each person has both a public key (which everyone knows) and a private key (which is kept secret). The mathematical algorithm provides one way encryption/decryption. Thus, the public key algorithm allows a user to encrypt a message with the key such that the message can only be unencrypted with a single private key. A receiver could transmit a public key to a sender, which encrypts a plain text message with the receiver's public key and transmits the encrypted text to the receiver, which decrypts the message using the receiver's private key.

In the present claimed invention, different public key encryption systems could be used by the universal serial bus smart card device (USB) of the present invention, including RSA, Diffie-Hellman and elliptic-curve cryptography.

One well known example known to those skilled in the art is public-key encryption using the secure sockets layer (SSL). It is part of the overall security protocol known as the transport layer security (TLS). As known to those skilled in the art, public-key encryption usually is based on a hash value that is computed from a base input number using the hashing algorithm. The hash value is a summary of an original value and it is difficult to derive the original input number without knowing the data used to create the hash value.

The present claimed invention uses a universal serial bus smart card device that not only acts as a "safe" for the public and private keys, but also behaves as a gateway as if it implements its own simple mail transfer protocol or post office protocol server. For purposes of description, the basic USB data flow between a USB host and a USB device and the various implementations and layers in accordance with the universal serial bus specification 2.0 are set forth in FIG. 2.

Figure 2:
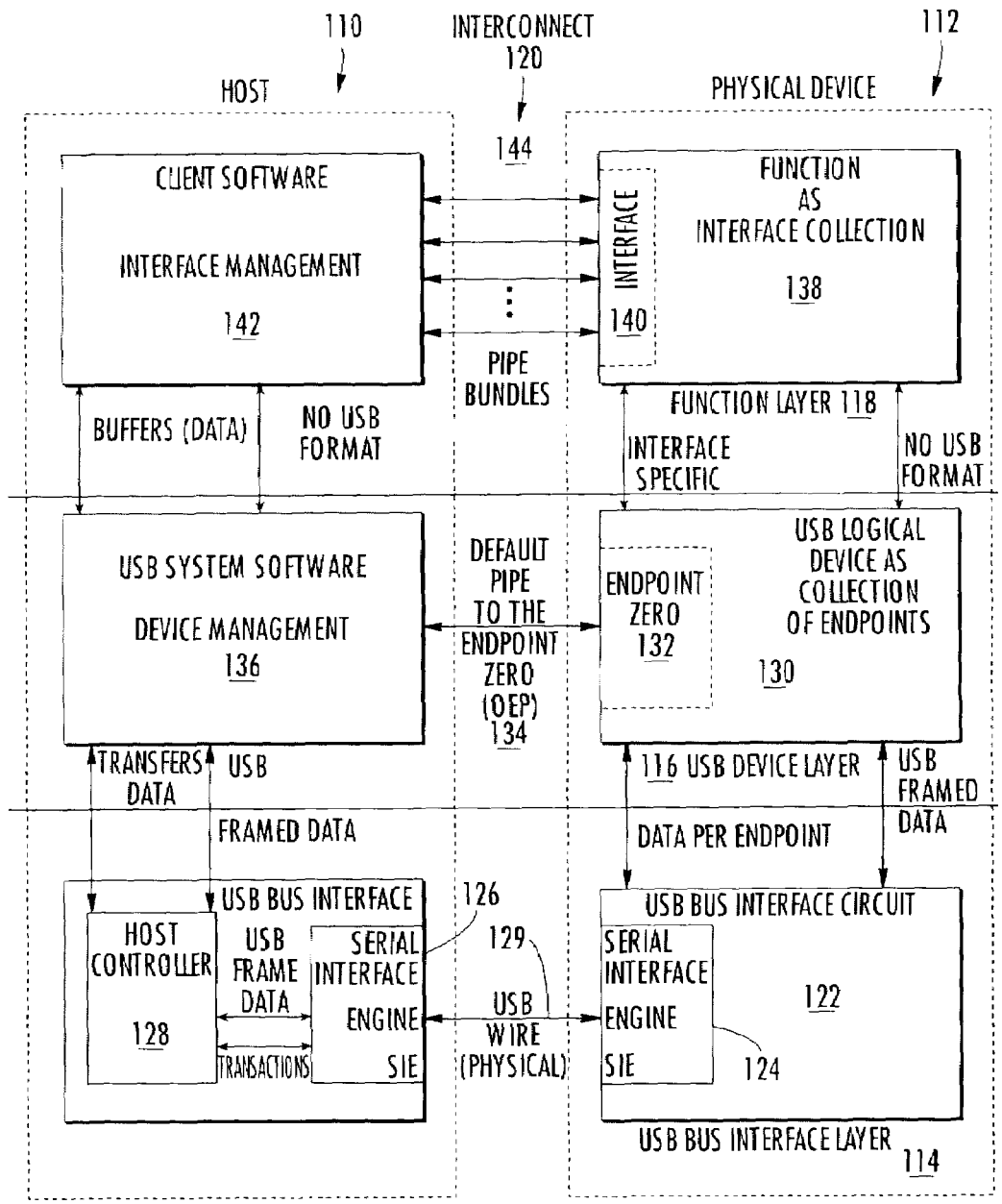
FIG. 2 is a block diagram of a USB host device showing various data transport mechanisms, pipes and the USB-relevant format of transported data between the host and interconnected physical device as used in the Universal Serial Bus specification revision 2.0.

As shown in FIG. 2, the connection of a host 110 to a physical device 112 requires the interaction between different layers, i.e., the USB bus interface layer 114, USB device layer 116, and function layer 118. An interconnect 120 between the host and device is illustrated.

The USB bus interface layer 114 includes a USB bus interface circuit 122 and serial interface engine (SIE) 124 at the device 112 that communicates with a serial interface engine (SIE) 126 and its host controller 128 at the host 110 via a physical wire 129. The USB device layer 116 includes at the physical device 112 a collection of endpoints as a USB logical device 130. An endpoint zero 132 is operable in communication via the default pipe 134 to USB system software 136 that is operable for device management at the host 110. The function layer 118 includes at the physical device 112, a logical function 138 as an interface collection, and the interface 140 that communicates via a plurality of pipe bundles 144 to client software 142 that is operable for interface management.

The USB bus interface layer 114 provides the physical wire 129 for the traffic signaling and packet conductivity between the host 110 and physical device 112. The USB device layer 116 views the USB system software 136 to perform generic USB operations with the physical device 112 via the default pipe 134 to endpoint zero 132. The functional layer 118 adds capabilities to the host using matched client software. The USB Device Layer 116 and Function Layer 118 each view logical communications within their layers and use the USB Bus Interface Layer 114 for any data transfer. The USB host 110 coordinates the overall USB system, controls access, and monitors the USB topology.

Logical communications exist between the client software and the Function Layer 118 and the USB system software 136 and USB logical device 130. Actual packets flow between the USB host controller 128 and the USB bus interface circuit 122.

As is known, USB physical devices add functionality to the host and have the same interface. Each physical device carries and reports configuration-related data, which it forwards to the host to allow the host to identify and configure the USB device. Typically, devices on the USB are connected to a host using a tiered star topology, including the hub. The host, on the other hand, communicates with each logical device as if it were directly connected to a root port. The client software manipulates a USB function interface of a device only as an interface of interest.

It should be understood that the actual communication flows across several interface boundaries. The two software interfaces for the host are a host controller driver (HCD) and a USB driver (USBD). A software interface between a USB host controller 178 and USB system software 176 implements the host controller driver and allows the host controller to implement functions without requiring the host software to be dependent on any particular implementation. One USB driver can support different host controllers. Specific knowledge of a host controller implementation is not required.

The USB logical device 130 can be considered a collection of endpoints and are grouped into endpoint sets to implement the interface. The USB system software 136 manages or controls the device using the default pipe 134 to the endpoint zero 132. Client software 142 manages the interface using pipe bundles 144 associated with an endpoint set. Data is moved between a buffer on the host 110 and an endpoint on the USB device 112 when client software requests the data. The host controller 128 or USB device 112, depending on the direction of data transfer, packetizes the data and forwards the packets over the bus. It also coordinates bus access. The host communicates with the physical device using a desired communication that is designed to match any communication requirements of the physical device and transfer characteristics provided by a USB.

The endpoint is an identifiable portion of the device that terminates the communication between the host. It can be a collection of independent endpoints. Default control uses input and output endpoints and the endpoint number "zero" as part of the default pipe 134.

The data transport mechanism includes transfers of data between the host controller 128 and the USB system software 136 at the host 110. Buffers can be used as a data transport mechanism between the USB system software 136 and the client software 142 at the host 110. The other data transport mechanism includes transactions between the host controller 128 and the serial interface engine 126 within the USB bus interface of the host.

The data transport mechanism also exists as a data per endpoint between the USB bus interface circuit 122 and the USB logical device 130 at the physical device 112. The data transport mechanism between the function 138 (and with the interface 140) and the endpoint zero 132 is interface-specific.

USB-relevant format of transported data occurs as USB frame data between the serial interface engine 126 and the host controller 128 and between the host controller 128 and the USB system software 136 at the host 110. No USB format of transporting data exists between the client software 142 that manages an interface and the USB system software 136.

At the device 112, USB-relevant format of transported data exists as USB frame data between the USB bus interface circuit 122 and the USB logical device 130. No USB format of data occurs between the interface 140 and the endpoint zero 32 at the device 112.

Further details of the functioning of the USB host and device and data flow can be found in the Universal Serial Bus Specification Revision 2.0, Chapter 5 entitled "USB Dataflow Model," the disclosure which is hereby incorporated by reference in its entirety.

It should be understood that in the present claimed invention, the universal serial bus smart card device (USD) may appear to implement its own SMTP or POP server, it does not replace the current SMTP and POP servers found on the internet. From the personal computer side, which is communicating with the USD via a smart card reader or other device, the USD appears as a real SMTP/POP server. In this particular example, the inner workings of the services, however, are slightly different.

Figure 3:
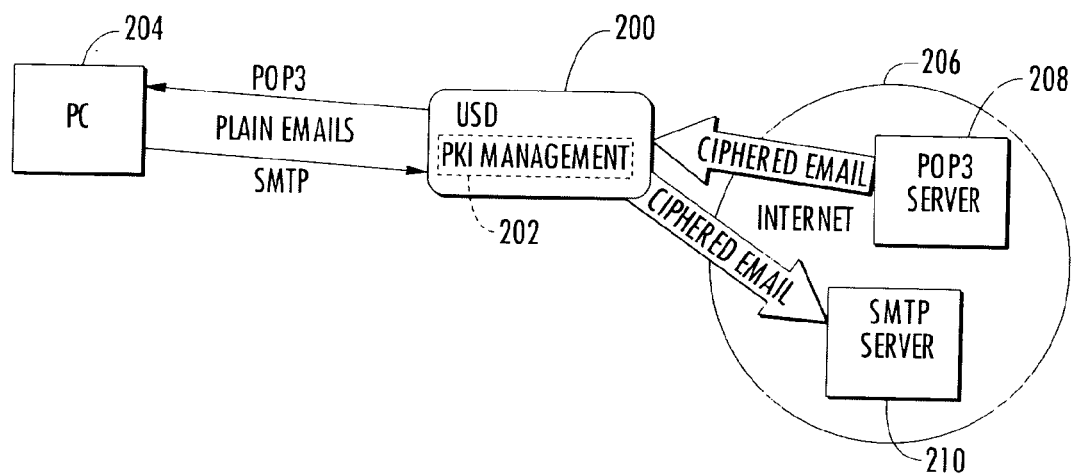
FIG. 3 is a block diagram showing the Universal Serial Bus smart card device (USD) with a public key management and operative with the SMTP server and POP3 server on the internet for delivering ciphered e-mails.

FIG. 3 is a block diagram and shows a universal serial smart card device (USD) 200 that has software and/or firmware 202 that is operative for public key (PKI) management and operative for sending plain e-mails using POP3 and SMTP protocol to the personal computer 204. Cyphered e-mails are sent to and from the USD 200 via the internet 206 and operative with the SMTP server 208 and POP3 server 210 as illustrated.

E-mail systems that use the internet for transfer of packets use two servers, i.e., the Simple Mail Transfer Protocol (SMTP) server 208 to handle incoming and outgoing e-mail transport, and the Post Office Protocol version 3 (POP3) server 210 that allows delivery of client messages by retrieving mail from the server and delivering it to a personal computer or other device.

E-mails are typically delivered using the internet with a source computer that establishes a TCP connection to port 25 of a destination computer. An e-mail daemon accepts connections and copies messages while using the Simple Mail Transfer Protocol, which is an ASCII protocol. Mail is exchanged using the TCP/IP protocol with a message transfer agent (MTA). The SMTP protocol describes how two message transfer agents communicate using the single TCP connection. In the internet protocol stack, the SMTP standard spooling occurs to allow mail to be sent from a local application to the SMTP application. The post office protocol, on the other hand, permits a computer to access dynamically a mail drop on a server host and retrieve mail. The server begins the POP3 service (or other POP services typically) by listening on a TCP port 110. A client computer establishes a connection with the server using that port and the server replies with a greeting. The client and server exchange commands and responses until closing the connection. It typically uses less than one dozen commands and is a simple protocol for allowing the retrieval of messages from the mail drop server. Thus, it should be understood that SMTP is used for sending and receiving messages and POP3 is used for storing and retrieving messages. The SMTP receiver receives all mail for domain, while a POP3 client retrieves only mail from a user's individual mailbox.

As known to those skilled in the art, the SMTP protocol implements five basic, but different commands and other commands as well:

HELO: opens the connection between client and server;

MAIL: specifies sender identity;

RCPT: specifies recipients;

DATA: sends e-mail body and attaches files; and

QUIT: ends client/server connection.

As to these basic SMPT commands, the "hello" (HELO) command identifies server/client to the receiver/server, and a greeting reply identifies the receiver/server to the server/client. The "mail" (MAIL) command initiates a mail transaction, specifies recipients, using an e-mail body and attached files. The "quit" (QUIT) command ends a client/server connection and specifies that a receiver must send an "okay" reply and close the transmission channel. Other commands used in the SMTP protocol include the "sender of mail" (SOML) that initiates a mail transaction in which mail data is delivered to one or more terminals or mailboxes and "sending mail" (SAML) that initiates a mail transaction where mail data is delivered to one or more terminals and mailboxes.

The "reset" (RSET) command specifies a current mail transaction to be aborted. The "verify" (VRFY) command asks a receiver to confirm that an argument identifies a user. The "expand" (EXPN) command confirms mailing lists. The "help" (HELP) command sends helpful information to the sender of a "help" command. The "noop" (NOOP) command specifies no action. The "turn" (TURN) command dictates that a receiver send an "okay" reply or send a "refusal" reply and retain the role of a receiver-SMTP.

It is important to note that Simple Mail Transfer Protocol implements e-mail outgoing services, and thus, the USB smart card device 200 behaves as a gateway from a client e-mail program on a PC 204. In order to make a client mailer pass through the USB smart card device, the SMTP outgoing parameter is set to the USB smart card device IP address. The USB smart card device will hold internally the "real" SMTP server 210 IP address.

Basic SMTP commands and their functions that are important for use with the present invention include:

HELO: just send it to the remote server and returns back the correct code;

MAIL: same as above;

RCPT: fetch from its internal key list to see if the message must be sent in an encrypted manner or not (the command is sent to the remote SMTP server and it returns the correct code);

DATA: If during the previous step, the USB smart card device had detected that an encryption is required (all recipients have a public key), then it encrypts all the data before sending it to the remote server, and returns the correct code (if no encryption is required, it transfers the data directly to the remote server); and QUIT: Send to the remote server and returns back the correct code.

Therefore, when attempting a "send" from the client e-mail program, there is no difference between when it communicates with a USB smart card device of the present invention and when it sends directly to its usual SMTP server (provided the substitution has been done correctly prior to use). The USB smart card device 200 functions as a "safe," holding the public and private keys required by the public key infrastructure. Therefore, the USB smart card device itself will encrypt the message and any subsequently attached files. As a result, any e-mail requiring privacy will be encrypted and stored as an encrypted file on the remote server. A key manager tool on the PC and described below ensures the security policy required by a user. It is also advantageous that when the client e-mail program is configured to allow messages on the server, no data remains unencrypted.

The post office protocol is generally symmetric to the outgoing message portion even if there are some new commands that must be handled. In the present invention, one difference between the SMTP and POP is the authentication. With the present invention and solution, security does not rely on the user password. Even when a "hacker" successfully attacks an e-mail server, the "hacker" will not be able to retrieve any sensible or understandable information or data as long as this information or data is stored in an encrypted manner.

It should be understood that the post office protocol implements a limited, but important, number of common commands:

USER: used to specify the user name to the remote POP server such as by entering a user ID;

PASS: used to specify the password for the user defined above, such as by entering a password;

LIST: used to retrieve a message list (i.e., message ID and size), including the listing of message headers and the size of each message;

STAT: used to retrieve the number of messages and the total size;

RETR: used to "fetch" a message from a distant server, such as by retrieving a message number;

QUIT: used to leave a session; and

DELE: used to delete a message from the remote server.

As already noted before, the sender/client e-mail program views the USB smart card device as its own POP server. The USB smart card device performs the description and returns the results of the commands back from the remote POP server to the client/server (mailer). The authentication remains the same as it is the same without using the USB smart card device.

The basic POP commands are handled by the USB smart card device as follows:

USER: sends to the remote server and returns back the correct code;

PASS: sends to the remote server and returns back the correct code;

LIST: sends to the remote server and returns back the correct code;

STAT: sends to the remote server and returns back the correct code;

RETR: operable as bulk treatment, the message content is decrypted using the private key stored in the universal smart card device and the decrypted message, and attached file, if any, is returned to the client mailer;

QUIT: sends to the remote server and returns back the correct code;

DELE: sends to the remote server and returns back the correct code.

The only treatment accomplished at this stage is decrypting "on-the-fly" any message contents coming from the remote POP server. The manner in which those two protocols are handled at the USB smart card level gives the following benefit to the user. Any sensible data is exchanged in an encrypted manner (outside of the e-mail client). Thus, no data can leave the personal computer without being encrypted, if required by a user. Another benefit is that the user can use the USB smart card device on any personal computer or other workstation with a USB port, requiring no software to be installed on the personal computer. This leads to a fully portable and secure solution for e-mail transmissions.

Key management within the USB smart card device is also an important aspect of the present invention. The private key is directly configured during user issuance and preferably is never changed. Thus, any company issuing the USB smart card device 200 of the present invention must keep track of the private/public key pair in case the end user loses the key pair. At the personal computer workstation, a basic key manager can add/revoke public keys. This key manager performs the following operation only on public keys:

a) add a new public key sent by a trusted user; and
b) revoke a key.

This basic public key infrastructure is an example used of how the secure SMTP/POP structure in the USB smart card device of the present invention can be used. Any public key infrastructure can be implemented using this system, for example, a user can add certificate management hash function or other mechanism.

Figure 4:
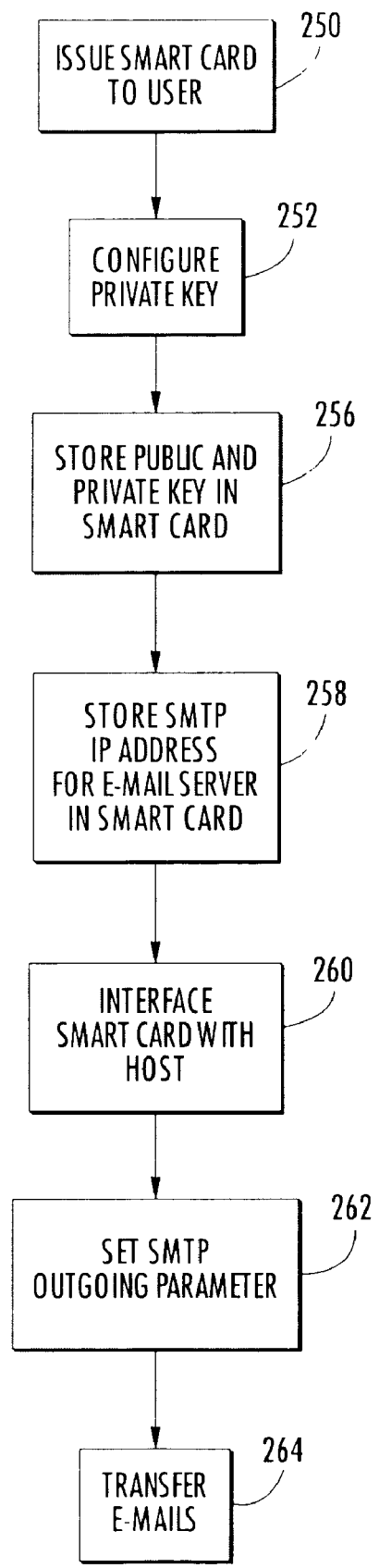
FIG. 4 is a high level flow chart showing an example of the basic method that can be used in the present invention.

FIG. 4 illustrates an example of a high level flow chart showing an example of the method that can be used with the present invention.

As illustrated, a smart card is issued to a user (block 250) such as by the manufacturer or marketing agent of a company that issues smart card devices, including, for example, the Universal Serial Bus smart card device (USD), shown in FIG. 3. A private key is configured upon issuance of the card (block 252). The private keys and public keys are stored in the smart card device (block 256). An SMTP IP address is stored in the smart card device for the user e-mail server (block 258). The smart card is interfaced with the computer having the e-mail client program (block 260). The SMTP outgoing parameter is set from the client e-mail program to an IP address of the smart card device (block 262). E-mails are then transferred (block 264).

Figure 5:
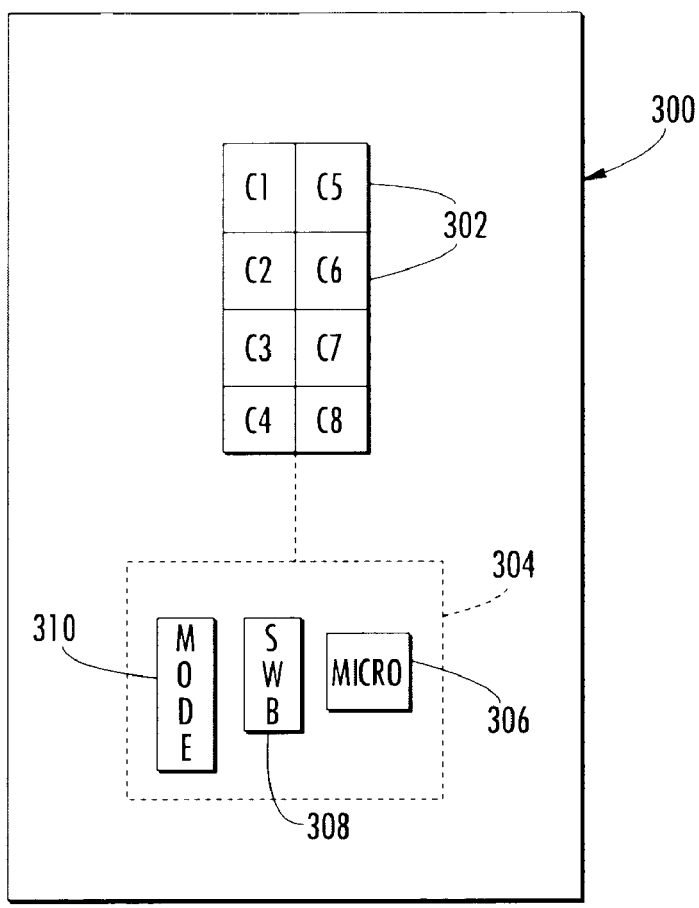
FIG. 5 is a block diagram of a smart card that can be used in the present invention.

Naturally, many different types of smart card devices can be used in the present invention, including smart card tokens and Universal Serial Bus smart card devices (USD). One type of smart card that can be used with the present invention is disclosed in U.S. Pat. No. 6,439,464 to Fruhauf et al., the disclosure which is hereby incorporated by reference in its entirety. As shown in FIG. 5, the smart card 300 is typically made of plastic and includes a plurality of electrical contacts or pads 302 that are positioned on the outer surface. For example, eight contacts or pads (C1 through C8) could be used. The pads are an external interface for the integrated circuit (IC) 304, which is embedded within the card and typically beneath the pads. The size of the card and position of the pads are usually determined by appropriate standards such as ISO 7816 protocol. Naturally, the IC can be embedded in other media such as a subscriber identity module (SIM) used with module phones, tokens or other wireless USB devices.

It should be understood that the IC can be a dual-mode IC that includes a microprocessor 306, a switching block 308, mode configuration circuit 310, and the external interface formed by the contacts 302 (C1 through C8). These contacts could include a voltage supply pad VCC, a reference voltage/ground pad GND, a first set of pads for the ISO mode and a second set of pads for a non-ISO mode. This first set of pads can include a reset pad RST, a clock pad CLK, and an input/output I/O pad in accordance with the ISO 7816 protocol. A second set of pads could include a D+ pad, DP and a D− pad DM in accordance with a USB protocol.

Figure 6:
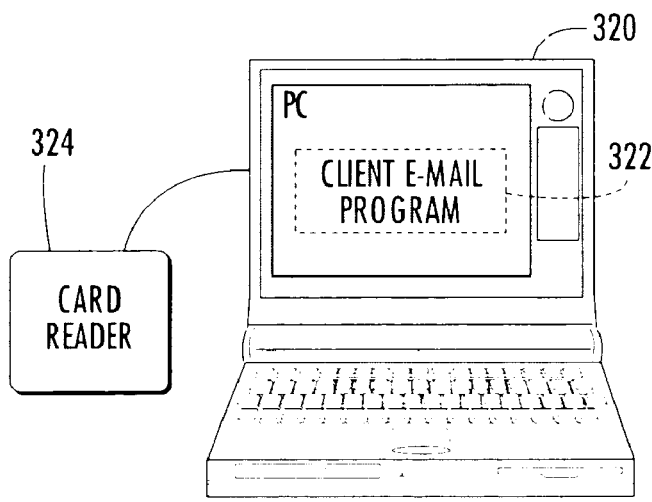
FIG. 6 is a block diagram of a personal computer and showing a smart card reader that can be used for reading the smart card device of the present invention, wherein the personal computer includes a client e-mail program.

As shown in FIG. 6, a personal computer 320 would have a client e-mail program 322. The central processing unit is operative with various input/output devices, such as the monitor, keyboard and mouse. A smart card reader 324 is used to control access to the PC and could be a separate peripheral device or incorporated into the CPU housing or the keyboard, for example. The smart card reader could also conform to the ISO 7816 protocol or a non-ISO protocol such as the universal serial bus (USB) protocol, which is preferred in the present invention. The USB protocol can be a hot "plug and play" and can be connected or disconnected from the PC without necessitating a reboot. A USB cable would include a voltage supply wire Vbus, a ground wire GND, a D+ wire DP and a D− wire DM, as known to those skilled in the art. The signal (DP and DM) carry a data stream in NRZI coding and includes the clock signal. This dual mode IC can be capable of operating in a first mode, such as the ISO mode, in accordance with the International Standard Organization 7816 (ISO 7816) protocol and a second non-ISO mode such as the USB mode in accordance with the Universal Serial Bus (USB) protocol. The dual-mode IC could operate selectively in one mode or the other, but typically not both modes simultaneously. The dual-mode smart card could include mode detection circuits, USB voltage detector, latching circuits, control registers, delay blocks, pull up resistors, and other configuration and control circuits as set forth in the incorporated by reference '464 patent.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A smart card system for transmitting and receiving secure e-mails comprising:
   a smart card device reader adapted to be connected to a host having a client e-mail program for transmitting and/or receiving e-mails to and/or from an e-mail server;
   a smart card device received within the smart card device reader and comprising,
      a card body; and
      an integrated circuit carried by the card body and comprising
      a memory for storing a set of instructions relating to initiating and completing smart card transactions between the smart card device and a port of the host and for storing both private and public keys for an encryption algorithm, and
      a processor operative for communicating with the host via the smart card reader and operative for transferring e-mails to and/or from the client e-mail program and the e-mail server via the smart card device while decrypting and encrypting any transmitted and/or received e-mails within the smart card device, wherein said memory is operative for storing a smart card device IP address for an email server, and a Simple Mail Transfer Protocol (SMTP) outgoing parameter is set to the smart card device IP address such that the smart card device is operative as a gateway from a client email program.

2. A smart card system according to claim 1, wherein said smart card device comprises a Universal Serial Bus smart card device (USD).

3. A smart card system according to claim 1, wherein said smart card device comprises a universal serial bus token.

4. A smart card system according to claim 1, and further comprising a password stored in said memory, wherein said smart card device is operative for transferring e-mails only after a correct password has been entered and matched to the password stored in memory.

5. A smart card system according to claim 1, wherein said private key is configured within said smart card device at the time of issuance.

6. A smart card system according to claim 1, wherein public keys are added and/or revoked based on user input.

7. A smart card system according to claim 1, wherein said smart card device is operative for returning the results of any commands back from a remote Post Office Protocol (POP) server to a client e-mail program on the host.

8. An integrated circuit comprising:
at least one memory for storing a set of instructions relating to initiating and completing smart card transactions between a smart card device and a communications port of a host and for storing both private and public keys for an encryption algorithm; and
a processor connected to the at least one memory and operative for communicating with a host and operative for transferring e-mails to and/or from a client email program on a host and a user email server via the smart card device while decrypting and encrypting any transmitted and/or received e-mails within the smart card device, wherein said memory is operative for storing a smart card device IP address for an email server, and a Simple Mail Transfer Protocol (SMTP) outgoing parameter is set to the smart card device IP address such that the smart card device is operative as a gateway from a client email program.

9. An integrated circuit according to claim 8, and further comprising a plurality of contact pads and operative for communicating with a universal serial bus port of a host.

10. An integrated circuit according to claim 8, and further comprising a password stored in said memory, wherein said processor is operative for transferring e-mails only after a correct password has been entered by a user and matched to the password stored in said memory.

11. An integrated circuit according to claim 8, wherein said private key is configured within said memory at the time of issuance to a user.

12. A smart card comprising:
a card body;
an integrated circuit carried by said card body and comprising at least one memory for storing a set of instructions relating to initiating and completing smart card transactions between a smart card and a communications port of a host and for storing both private and public keys for an encryption algorithm; and
a processor connected to the at least one memory and operative for communicating with the host and operative for transferring e-mails to and/or from a client e-mail program and a user e-mail server via the smart card while decrypting and encrypting any transmitted and/or received e-mails within the smart card device, wherein said memory is operative for storing a smart card IP address for an email server, and a Simple Mail Transfer Protocol (SMTP) outgoing parameter is set to the smart card IP address such that the smart card device is operative as a gateway from a client email program.

13. A smart card system according to claim 12, wherein said smart card further comprises a plurality of contact pads and operative for communicating with a Universal Serial Bus (USB) port of a host.

14. A method of transmitting and receiving secure e-mails comprising the steps of:
storing in a smart card device both private and public keys for an encryption algorithm;
user interfacing the smart card device with a host having a client e-mail program;
transferring e-mails to and/or from the client e-mail program and an e-mail server via the smart card device while decrypting and encrypting any transmitted and/or received e-mails within the smart card device;
storing within a smart card device memory a smart card device IP address for an email server; and
setting a Simple Mail Transfer Protocol (SMTP) outgoing parameter to the smart card device IP address such that the smart card device is operative as a gateway from a client email program.

15. A method according to claim 14, and further comprising the step of storing the private and public keys in a Universal Serial Bus smart card device (USD).

16. A method according to claim 14, and further comprising the step of storing the private and public keys on a smart card token.

17. A method according to claim 14, and further comprising the step of transferring e-mails to and/or from the e-mail server using the internet.

18. A method according to claim 14, and further comprising the step of inputting a password and matching the input password to a stored password in the smart card device, and when there is a match, enabling access through the smart card device to any encrypted e-mails on the email server.

19. A method according to claim 14, and further comprising the step of inputting a password and matching the input password to a stored password in the smart card device, and when there is a match, enabling transmission through the smart card device of e-mails.

20. A method according to claim 14, and further comprising the step of configuring the private key stored in the smart card device at the time when the smart card device is issued.

21. A method according to claim 14, and further comprising the step of running a key manager on the host that is operable for adding/revoking public keys.

22. A method according to claim 14, and further comprising the step of adding a new public key that is transmitted by a trusted user and/or revoking a public key.

23. A method according to claim 14, and further comprising the step of returning from the smart card device any results of commands back from a remote Post Office Protocol server to the client e-mail program on the host.

24. A method according to claim 23, and further comprising the step of performing description on the smart card device.

* * * * *